Figure 1:
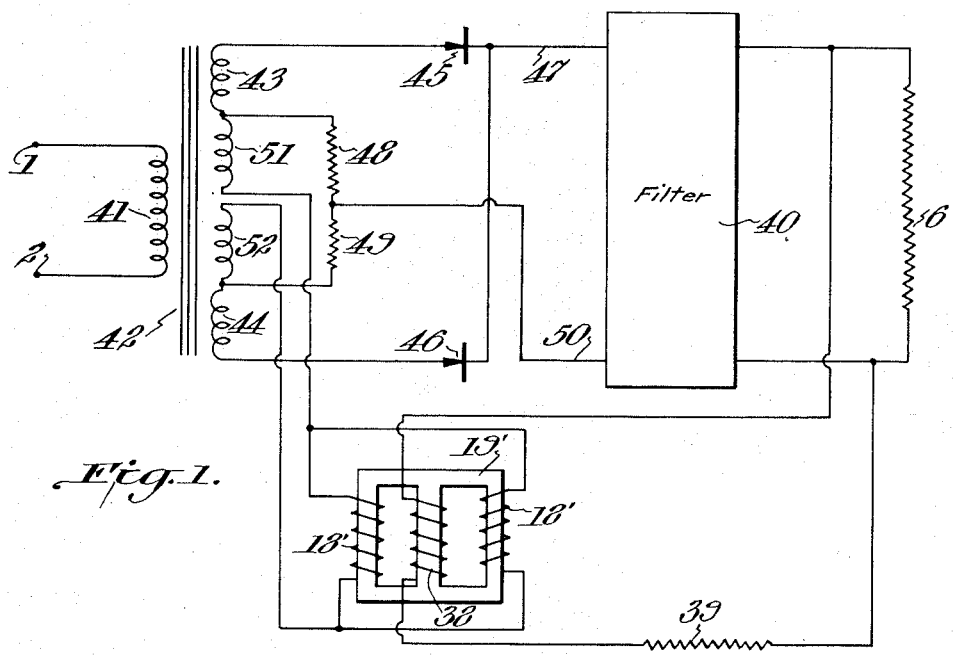

Nov. 6, 1928.

G. B. CROUSE ET AL 1,691,022

VOLTAGE REGULATOR

Original Filed Sept. 8, 1926

Inventors:
George B. Crouse,
Jacob L. Jatlow,
By Byrnes Townsend Brickenstein
Attorneys.

Patented Nov. 6, 1928.

1,691,022

UNITED STATES PATENT OFFICE.

GEORGE B. CROUSE, OF WOODCLIFF, AND JACOB L. JATLOW, OF ELIZABETH, NEW JERSEY, ASSIGNORS TO CONNER CROUSE CORPORATION, OF NEW YORK, N. Y., A CORPORATION OF NEW YORK.

VOLTAGE REGULATOR.

Original application filed September 8, 1926, Serial No. 134,249 Divided and this application filed September 15, 1926. Serial No. 135,693.

This invention relates to voltage regulators and more particularly to automatic regulators for controlling the voltage impressed upon a load line under variations in an electrical condition which tends to alter the voltage across the load.

The invention is particularly useful in effecting a control of the output voltage of an electrical converter. The control is usually designed to maintain the output voltage constant, but this is not essential as the design may be such that the voltage across the load varies in the same sense or in a sense opposite to that which would normally accompany a change in the critical electrical condition upon which the regulation is based. In supplying current to a load from a source of energy and through an electrical converter, the particular electrical condition which determines the regulation may be the input voltage, the voltage across the load itself, or the value of the load.

In accordance with this invention, the desired regulation is effected by passing current from the source or from the load line through a regulating resistance, and controlling the effect of the resistance upon that current by simultaneously subjecting the resistance to the influence of an additional current, which additional current may pass through the regulating resistance or through a separate resistance thermally coupled thereto. The regulating resistance may be formed of material having a negligible or a high temperature-resistance coefficient, and in the preferred embodiments of the invention the resistance is free from mechanically movable parts and electric make-and-break contacts. When the resistance is formed of material having a negligible temperature-resistance coefficient, it is of the type commonly designated a "fixed resistance." Since this term would be misleading when applied to a resistance whose value varies with temperature changes, the term "static resistance" is employed in the following specification and claims to designate a resistance which is free from moving parts or make-and-break contacts, but which may or may not be formed of such material that its effective value varies with temperature changes.

This application is a division of our copending application, Serial Number 134,249, filed Sept. 8, 1926, which application includes a description of and generic claims to the present invention. The claims of this application are restricted to methods and apparatus which are excluded by the terms of the specific claims of our copending application.

An object of the invention is to provide a method of and apparatus for regulating the voltage across a load line in accordance with variations in the load resistance or the voltage across the load. More specifically an object is to provide a method of and apparatus for effecting the stated control by including a static resistance in the load line circuit, and controlling the effect of the resistance upon the line voltage by passing through the resistance an additional current which varies as a function of the load or the load voltage.

Figure 2:
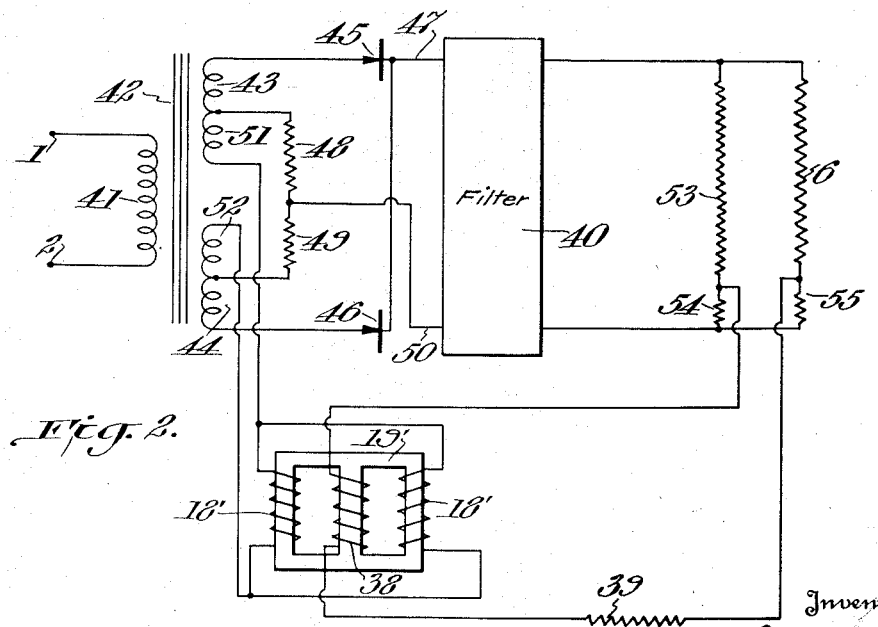

These and other objects of the invention will be apparent from the following specification when taken with the accompanying drawings, in which:

Fig. 1 is a circuit diagram of apparatus for effecting the control from variations in the voltage across the load; and Fig. 2 is a diagram of apparatus for effecting the control from variations in the load resistance.

In Fig. 1, the numerals 1 and 2 indicate the terminals of an alternating current supply line across which the transformer primary 41 is connected. The transformer has a core 42 and a pair of secondary windings 43, 44, for supplying current to the rectifiers 45, 46, respectively. Like terminals of the rectifiers 45, 46 are connected to each other and to one side 47 of the direct current load line, the other rectifier terminals being connected to a terminal of the respective secondary windings 43 and 44. The other terminals of secondaries 43, 44 are connected to each other through a series resistance comprising sections 48, 49 whose junction point serves as the terminal for the other side 50 of the load line. The static resistance 48, 49 may be of substantially constant value or its value may vary with its temperature. The winding for impressing a regulating voltage across the static resistance is preferably formed in two sections 51, 52, whose outer ends are joined to those terminals of the windings 43, 44 which are connected to the static resistance. The inner ends of the sections 51, 52 of the regulating secondary are connected through a series inductance comprising the two oppositely wound coils 18' on the outer legs of the three-legged core 19'. To control the reactance of the inductance 18', the magnetic saturation of the iron core 19' is controlled by means of a coil 38 which is wound on the inner leg of the core and is connected in parallel with the load 6 through a series resistance 39.

Although not limited in its application to a supply system for delivering a substantially ripple-free current from an alternating current source the invention is particularly adapted for such use. A filter 40 of any desired type may be included in the load line between the converter and the load 6. The resistance 39 must permit the passage of sufficient current to effect the desired regulation, but is preferably of such relatively high value that the amount of direct current required by the voltage regulator will be small as compared to the current passed over the load. The two sections of the inductance 18' are so proportioned that no alternating current potential will be introduced to the load circuit through the coil 38.

When the resistances 48 and 49 have a high temperature-resistance coefficient one effect of the variation in source voltage is to change their effective value, since an increase in source voltage will result in a greater flow of current through the regulating windings and therefore an increase in the temperature of the resistances. As the static resistance is a series element of the direct current load circuit, an increase in its value causes a lesser portion of the increased direct current voltage to be passed to the load 6. The regulating effect is not due solely, however, to the change in resistance of the members 48, 49, but is modified by the fact that the voltage impressed upon the rectifiers is supplied in part by the intermediate windings 51, 52. The effective voltage as well as the current supplied by the regulating winding therefore affects the voltage across the load. The modifying action of the voltage drop may best be understood by first analyzing the operation of the circuit as constructed with resistances 48, 49 which are of substantially constant value.

The effective alternating current voltage applied to a given rectifier, for instance, the rectifier 45, consists of two parts, one applied from the winding 43 and the other arising from the voltage drop across the resistance 48 due to the intermediate winding 51. The voltages set up across the terminals of the windings 43, 51 are dependent upon the source voltage and will both vary in the same sense and at the same rate with changes in the source voltage. By a proper design of the elements the effect of a change in the voltage across the winding 43 may be compensated, in whole or in part, by the change in the voltage drop across the resistance 48 which results from the simultaneous change in voltage induced in the winding 51, as modified by the coil 18'. The magnitude of the regulating current supplied by the winding 51, 52 is determined by the reactance of the inductance 18' which is varied as a function of the voltage across the load 6.

When it is desired to make use of the action just described, the use of the inductance 18' is essential, as otherwise the drop across the resistance would be a constant proportion of the source voltage. In the foregoing explanation the difference in phase between the voltage of the winding 43 and that impressed across the resistance 48 by the winding 51 is not taken into account. This phase difference must be considered in the structural design of a system, but does not affect the validity of the above explanation of operation.

While the above explanation has been directed to only one-half of the rectifier system, it will be apparent that the same effect takes place across the other half. The voltages of the coils 43, 44 will not be in phase with the voltages established in the resistance 48, 49 by the regulating windings and this difference in phase should be taken into account in the design of a particular regulating system. The design of the parts will also be dependent upon the temperature-resistance characteristics of the static resistance elements.

Returning to a consideration of the operation of the system when the elements 48 and 49 are formed of material having a high temperature-resistance coefficient, it will be apparent that the effective voltage drop to which current from the winding 43 is subjected on passage through the resistance 48 is dependent both upon the magnitude of the regulating current originating in the winding 51 and upon the voltage drop to which that current is subjected on passing through the resistance. Both of these factors must be considered in the structural design and their separate effects may be either aiding or opposing with respect to each other.

The regulation of the line voltage may be made dependent upon the value of the load resistance by including the load as one arm of a bridge circuit.

Many of the elements of a circuit for effecting regulation by fluctuations in the magnitude of the load may be practically identical with the corresponding elements of a circuit in which the regulation is based on variations of the voltage across the load. The circuit of Fig. 2 differs from that of Fig. 1 as to the connections between the control winding 38 and the load line. The load line and the control winding 38 are arranged as the cross-arms of a bridge which is formed by the load 6 and the impedances 53, 54 and 55. The resistance 55 should be of comparatively low value and of the same current carrying capacity as the load 6. The resistances 53 and 54 should preferably be of high resistance in comparison with the load 6 and resistance 55, and may be of smaller current carrying capacity.

It will be noted that the circuits differ as to the relative sense of the windings 43, 44 and the windings 51, 52 of the regulating circuit. As shown in Fig. 1, the sets of secondary windings are opposed and in Fig. 2 the secondaries are all wound in the same sense. The relative sense of the windings must be considered in the design of the circuit elements, but either the opposed or aiding windings may be used in a particular circuit.

When the load line secondary 43 and the regulating secondary 51 are wound in the same sense, the bridge in which the load 6 is included should be so arranged that a decrease in the load resistance will cause an increase of direct current to flow in the control winding 35. This increase of current will change the magnetic saturation of the core 19', a greater alternating current will therefore be allowed to pass from winding 51 to the resistance 48, a larger regulating potential drop across this element will be applied to aid the voltage of the secondary 43, and thus an increase in voltage across the load line 47, 50 will result. By a proper design of the various elements the voltage across the load may be kept constant as the line voltage changes in accordance with fluctuations in the load resistance. This system of regulation does not correct for variation in the source voltage.

It is to be noted that the voltage regulation may be obtained without the use of mechanically movable parts or electric make-and-break devices. It will be obvious that while certain elements may be moved for effecting a preliminary or occasional adjustment of a particular system, the actual regulation for variations in a critical electrical condition will take place automatically when the parts are suitably designed to effect that result.

It is to be understood however that while the invention may be embodied in an automatic regulator, manually operated switches or other devices may be used in connection with or as substitutes for the elements which effect the automatic regulation. So far as applicants are aware, it is broadly new to effect voltage regulation by introducing a resistance of substantially constant value as an element of the circuit in which regulation is desired, and controlling the effect of that resistance upon the voltage of the circuit by simultaneously applying across the resistance a regulating voltage which is varied in accordance with the desired nature of the regulation.

The several circuits described herein indicate the manner in which the invention may be practiced, but it is apparent that the invention is not limited to these illustrative circuits.

We claim:

1. A voltage regulator for an electrical system of the type including a source of energy, a load line and a resistance of substantially constant value, serially arranged in a circuit, said regulator comprising an additional circuit shunted across said resistance for applying thereto a regulating voltage, and means in said additional circuit so coupled to said series circuit that the voltage of said additional circuit is dependent upon the voltage across the load.

2. A voltage regulator for an electrical system of the type including a source of energy, a load line, and circuit elements for energizing said load line from said source through a series resistance of substantially constant value, said regulator comprising an additional circuit energized from said source for applying a regulating voltage across said resistance, and means dependent upon the voltage across the load for controlling the magnitude of said regulating voltage.

3. An electrical system comprising a source of energy, a load line, a converter adapted to be energized from said source to deliver current to said load line, a series resistance of substantially constant value between said converter and load line, a circuit adapted to be energized from said source independent of said converter for applying a regulating voltage across said resistance, and means for controlling the magnitude of the voltage in said additional circuit in accordance with the voltage across the load.

4. An electrical converter for supplying current to a load line from a source of alternating current, said converter comprising a transformer having a primary for connection across said source and a secondary winding for energizing a load line, a resistance of substantially constant value in series with said secondary, an additional secondary winding on said transformer and connected across said resistance to supply a regulating voltage thereto, and means adapted to be connected across the load line controlling the regulating voltage impressed on said resistance in accordance with the voltage across the load.

5. The invention as set forth in claim 4, wherein the circuit between said regulating winding and said resistance includes an inductance having a core of magnetic material, and said means comprises a winding associated with said core for varying the magnetic saturation thereof in accordance with variations in the voltage across the load.

6. In an electrical system for supplying a direct current load line from a source of alternating current, a transformer having a primary winding for connection across said source and a plurality of secondary windings, a pair of said secondary windings having a terminal in common, a resistance of substantially constant value connected to said common terminal, a rectifier, a load line completed through one of said pair of windings, said rectifier and said resistance, a regulating circuit effective to control the voltage in said first circuit, said circuit including said resistance and the second of said pair of windings, and means for controlling the magnitude of the current in said regulating circuit in accordance with changes in the voltage across the load.

7. The invention as set forth in claim 6, wherein said means comprises an inductance having a core of magnetic material and included in said regulating circuit and a second winding on said core and shunted across the load, whereby the magnetic saturation of said core varies with changes in the voltage across the load.

8. In an electrical system for supplying a direct current load line from an alternating current source, a transformer having a primary winding for connection across said source, and a pair of secondary windings, a resistance of substantially constant value, a pair of rectifiers, said pair of secondary windings having a terminal of each connected through said resistance and having their other terminals connected through said rectifiers, said rectifiers being oppositely arranged and serially connected, whereby an intermediate point of said resistance and the junction point of said rectifiers serve as terminals for a direct current load line, a circuit additional to said secondary windings for impressing a regulating voltage across said resistance, and means operative by the voltage across the said load line for determining the magnitude of said regulating voltage.

9. The invention as set forth in claim 8, wherein said circuit includes an additional secondary winding having its terminals connected to those terminals of said pair of secondary windings which are connected through said resistance.

10. The invention as set forth in claim 8, wherein said circuit includes a secondary winding additional to said pair of secondary windings and an inductance in series therewith, and said means is associated with said inductance for varying the resistance thereof in accordance with variations in the voltage across the load.

11. The invention as set forth in claim 8, wherein said circuit includes a secondary winding additional to said pair of secondary windings and an inductance in series therewith, and said means comprises a magnetic core for said inductance, a winding thereon and adapted to be connected across the load, whereby the magnetic saturation of said core is dependent upon the voltage across the load.

In testimony whereof, we affix our signatures.

GEORGE B. CROUSE.
JACOB L. JATLOW.